(12) United States Patent
Giessler

(10) Patent No.: US 7,073,988 B2
(45) Date of Patent: Jul. 11, 2006

(54) THREADED TOOL WITH COOLANT SUPPLY

(75) Inventor: Josef Giessler, Mühlenbach (DE)

(73) Assignee: Sandvik Intellectual Property AB, Sandviken (SE)

( * ) Notice: Subject to any disclaimer, the term of this patent is extended or adjusted under 35 U.S.C. 154(b) by 272 days.

(21) Appl. No.: 10/679,281

(22) Filed: Oct. 7, 2003

(65) Prior Publication Data

US 2004/0131434 A1   Jul. 8, 2004

(30) Foreign Application Priority Data

Oct. 8, 2002   (DE) ................ 102 46 871

(51) Int. Cl.
*B23G 5/06* (2006.01)
(52) U.S. Cl. ............... 408/59; 408/222; 470/198
(58) Field of Classification Search ............ 408/57, 408/59, 222; 470/198
See application file for complete search history.

(56) References Cited

U.S. PATENT DOCUMENTS

| | | | |
|---|---|---|---|
| 2,388,022 A | 10/1945 | Tucker et al. | |
| 2,867,140 A | 1/1959 | Getts | |
| 3,028,772 A * | 4/1962 | Mossberg | 408/59 |
| 4,032,250 A * | 6/1977 | Lavallee | 408/59 |
| 4,168,925 A * | 9/1979 | Dufresne | 408/59 |
| 4,322,189 A * | 3/1982 | Briese | 409/136 |
| 4,693,646 A | 9/1987 | Andrews | |
| 4,762,444 A | 8/1988 | Mena | |
| 4,921,376 A * | 5/1990 | Tani et al. | 409/131 |
| 5,030,040 A * | 7/1991 | Wood | 408/59 |
| 5,993,120 A | 11/1999 | Giessler | |

FOREIGN PATENT DOCUMENTS

| | | | |
|---|---|---|---|
| DE | 33 07 555 | | 9/1984 |
| DE | 19837704 | * | 3/2000 |
| DE | 10227687 | * | 1/2004 |
| EP | 0026787 | * | 4/1981 |
| FR | 1 068 255 | | 6/1954 |
| JP | 63-306820 | * | 12/1988 |
| JP | 2-100820 | * | 4/1990 |
| JP | 6-71508 | * | 3/1994 |
| JP | 2003-53605 | * | 2/2003 |
| WO | 92/07678 | * | 5/1992 |

* cited by examiner

*Primary Examiner*—Daniel W. Howell
(74) *Attorney, Agent, or Firm*—Drinker Biddle & Reath LLP

(57) ABSTRACT

A threading tool for generating a thread in a workpiece, includes a threading part which defines a longitudinal axis. A cooling channel extends inside of the threading part along the axis to a front end surface thereof for supplying a coolant. Longitudinally extending passages are disposed in an outer periphery of the threading part for the return of coolant exiting the coolant channel. A diversion element is positioned at the front end surface for diverting the exiting coolant in a laterally outward direction along the front end surface toward the passages.

17 Claims, 3 Drawing Sheets

THREADED TOOL WITH COOLANT SUPPLY

This application claims priority under 35 U.S.C. §§ 119 and/or 365 to patent application Ser. No. 102 46 871.0 filed in Germany on Oct. 8, 2002, the entire content of which is hereby incorporated by reference.

BACKGROUND OF THE INVENTION

The present invention relates to a threading tool for the production of threads, in particular for the cutting of internal threads.

The term "threading tool" is intended to include both thread-cutting tools, e.g. screw taps or thread milling cutters which cut chips, and thread-forming tools, so-called thread formers, inasmuch as they are provided in each case for the production of internal threads. In both cases, the tool is introduced into an already existing core bore or core hole bore in order to form the internal thread.

During thread "forming" (as opposed to "cutting"), the thread is moulded into the core bore, i.e. there is a softening of the material (plastic deformation), and the material flows around the teeth of the thread former and forms the characteristic thread profile. Thread forming is a reshaping manufacturing process without the formation of chips. Moreover, through the deformation a smoother and stronger surface can mostly be achieved, as the deformation is associated with a compacting of material.

During tapping, the threading tool, in the form of a thread-cutting tool, tool is screwed into the bore at a rate precisely matched to its speed, while the cutting teeth, which are arranged in several essentially parallel-running groups (called hob-blade inserts), cutting the threads. With a single-flight thread, the distance between the cutting teeth, arranged behind one another in axial direction, of a group corresponds exactly to the thread pitch and/or the height of a thread.

In general, the threading tool has a shank or a shank part and a threading part or cutting edge section. The threading part has spiral threads running round the peripheral surface. In a tap, the threads are interrupted by longitudinally extending passages in the form of flutes.

The threading part of threading tools consists in most cases of a gate and a guide part. The gate is provided with a tapering cross-section and carries out most of the chip cutting and/or the deformation. The guide part serves essentially only for guiding and has no, or only a very slight, taper.

These tools are often operated with a coolant or a cooling lubricant which is intended to reduce the friction between tool and workpiece, remove process heat from the contact point, ensure a good chip transport and achieve a good surface quality. The coolant can be supplied in different ways, but is usually removed again via the flutes. To remove the coolant or cooling lubricant, the threads of a thread former are therefore also interrupted in the axial direction by axial passages in the form of grooves, so-called oil grooves. However, as the oil grooves of a groove former serve merely for the removal of the coolant and not the removal of chips, the oil grooves can be developed less deep, as compared with the flutes of thread cutting tools, and optionally also less wide.

With threading tools, the supply of coolant or cooling lubricant is not easy because, during the cutting process, the tool is almost completely surrounded by the material to be worked. Thus the blades formed by the threading part are in general not accessible from the outside. In order therefore to conduct the required coolant to the chip cutting location, two different methods and tools are known in the state of the art.

In the first method, the coolant is supplied axially. This means that there is an axially-running coolant through bore in the centre of the tool. If this tool is introduced into a core bore designed as a bottom or blind hole, the coolant emerging from the coolant channel flows firstly into the bottom hole. After the bottom hole is filled with coolant, the coolant continuing to flow through the axially-running coolant channel forces the coolant past the tool and through the flutes or oil grooves out of the bottom hole. This results in an effective removal of the chips produced during the chipping process.

It is obvious that such threading tools can be used only with bottom hole threads, as with through holes the coolant would not reach the blades but simply flow through the through hole.

In the second method, there is a radial coolant supply. Although the tool in this case also has a central bore which forms an axially running coolant channel, this channel does not extend to the end surface of the tool. Therefore either a blind hole bore is provided or initially a through bore is produced which is then closed again at its end surface. In addition radial bores are provided in these tools, extending from the circumferential surface of the tool to the central axially running coolant channel.

Typically the radial bores are arranged such that each of them connects the centrally running coolant channel to a flute and/or oil groove.

In the known tools, the radially running coolant bores do not run perpendicular to the axial bore, but are inclined forwards, i.e. towards the end surface of the tool. There are essentially two reasons for this. Firstly, the coolant can thereby be conducted in the direction of the gate, as in this area, as already stated, most of the chip cutting and/or deformation and thus also most of the heat development occurs. Secondly, the attenuation of the tool core cross-section, which is necessarily associated with the provision of radially running channels, is thus reduced.

However, considerable disadvantages are associated with both previously known versions. With the axial coolant supply, the scope of application is restricted to bottom hole threads, because with through holes the coolant would not reach the blades.

Although the version with the radial coolant supply is very versatile, it is very elaborate and therefore expensive, as the production of the generally very small radial bores is possible only by milling in combination with drilling or erosion.

In addition, the radially running bores, even if they are inclined in the direction of the end surface of the tool, lead to a considerable attenuation of the cross-section and thus of the tool. In the worst case, this can lead to a tool fracture in the area of the radial bores.

Moreover, with the customarily used inclination of the radially running coolant bores, the coolant jet is directed against the chip flow. This necessarily leads, with threaded cutting tools, to an inadequate removal of chips. In addition, the supply of cooling lubricant to the guide part is insufficient.

Starting from this state of the art, the object of the present invention is to provide a threading tool with a threading part having at least one flute or oil groove and an axially running cooling channel which extends essentially to the end surface of the tool, which is easy to produce, has a long tool life, i.e. with which in particular the danger of tool fracture is clearly reduced, which can be used both when tapping a through hole and with a bottom hole thread, and with which the supply of the coolant or the cooling lubricant is such that a chip flow is not hindered, but supported, and with which the coolant or cooling lubricant sufficiently supplies both gate and guide part.

SUMMARY OF THE INVENTION

This object is achieved according to the invention in that a diversion element is provided which is arranged such that coolant flowing out of the cooling channel is diverted radially outwards at the diversion element. Such a tool is very easy to produce as an axially running bore merely needs to be introduced into the tool. To this extent, the tool according to the invention does not differ from the tool of the state of the art with axial coolant supply. In addition, however, a diversion element is provided according to the invention with the help of which the coolant, after it has emerged from the axially running coolant channel at the end surface, is diverted in radial direction.

The diversion element can advantageously consist for example of a disk secured to the end surface of the threading tool. The coolant then emerges during use in axial direction from the cooling channel and is diverted radially outwards at the diversion disk and reaches the flutes or oil grooves. The threading tool according to the invention can therefore also be used with through bores.

Advantageously the diversion element, at least in the area of the flutes or oil grooves, is radially extended, i.e. perpendicular to the tool axis which extends at least to the drill core, preferably beyond it, and particularly preferably to the thread core diameter.

Advantageously, at the end surface of the threading tool, the diversion element at least partially covers the grooves, i.e. the flutes or the oil grooves. Particularly preferably, the diversion element extends as far as the thread core diameter, but not beyond it. This ensures that only a small portion of the coolant—ideally no coolant whatsoever flows forwards in axial direction, i.e. into the core bore. In other words it is ensured that almost all of the coolant is conducted via the flutes or oil grooves past the tool over gate and guide part. If the diversion element extends beyond the thread core diameter, this usually means—regardless of the chosen core bore diameter—that the diversion element can engage with the tool during the work process, which is disadvantageous with some uses.

In order to ensure as good as possible a supply of coolant to the thread part, it is provided in a particularly preferred version that on the end surface of the tap there is a passage between the cooling channel and at least one flute or oil groove. This passage can consist for example of a trough which has been milled into the end surface of the threaded tool. The coolant leaving the axial coolant channel then flows radially outwards between the diversion element and the end surface of the threading part, it being ensured by the at least one passage that a sufficiently large amount of coolant or cooling lubricant is transported radially outwards in the area of the flute or oil groove. Advantageously the passage runs between axial cooling channel and flute or oil groove approximately perpendicular to the longitudinal axis of the tool or to the axially running cooling channel. With this version, the diversion element can be fitted directly onto the end surface of the threaded tool.

In a particularly expedient version, the diversion disk has at least one recess. The recesses serve to divert the coolant flow or the cooling lubricant flow as required. The coolant flow can thereby be set very precisely. The recesses can be formed for example by pressings-in. Alternatively or in combination it is however also possible to realize the recesses by grooves or troughs incorporated into the diversion disk. The recesses are advantageously arranged rotation-symmetrical about the cooling channel axis. For example at least one recess can be circular. Of course, hollows can also be formed which are arranged according to the position of the flutes or oil grooves in order to ensure as efficient a diversion as possible of the cooling lubricant to the flutes or oil grooves.

In a further preferred version, the diversion element is secured, preferably welded, particularly preferably by means of spot welding, to the threading part. Production of the threading tool according to the invention is thereby still further simplified as the thread part and the diversion element can be manufactured separately and can be easily secured to one another thereafter.

It has been shown that the threading tool according to the invention is developed as a thread former in a particularly expedient version. However, it can of course also be advantageously developed as a bottom hole screw tap.

The threading part preferably consists of hard metal, in particular of HSS(E). It goes without saying that the diversion element can in most cases consist of a softer material because it is not provided with some versions of the present invention that the diversion element engages with the workpiece. The diversion element is rather preferably dimensioned such that it can dip into the core bore drilled before the actual production of the thread, without touching the workpiece.

The diversion disk therefore advantageously has a diameter which essentially corresponds to the thread core diameter.

BRIEF DESCRIPTION OF DRAWINGS

Further advantages, features and possible applications become clear from the following description of preferred versions and also the associated figures.

FIG. 2a a schematic longitudinal-section view of a first preferred embodiment of the present invention.

FIG. 2b is a schematic end view of FIG. 2a.

DESCRIPTION OF PREFERRED EMBODIMENTS OF THE INVENTION

Figure 1:
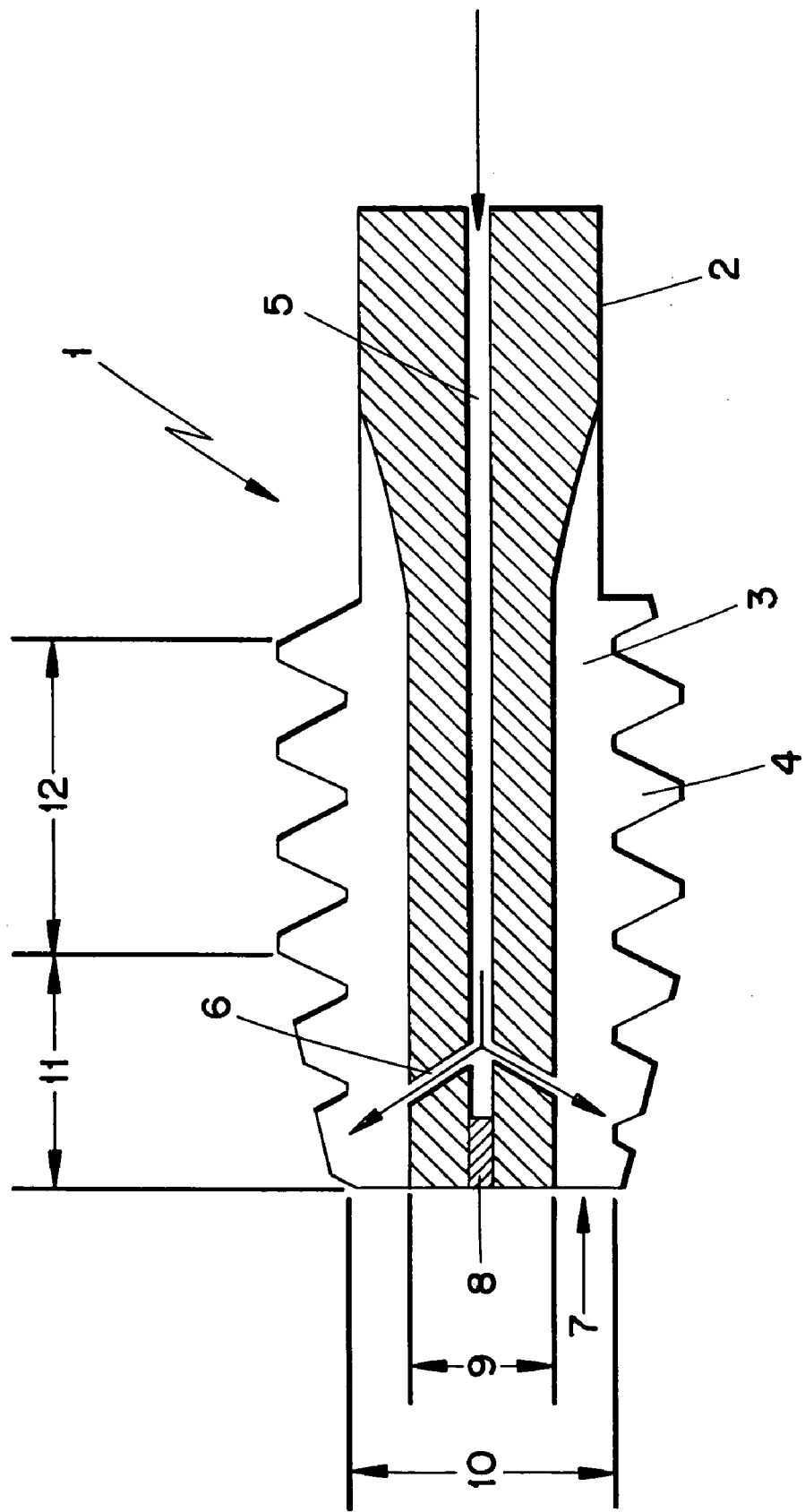
FIG. 1 a schematic representation of a version of a tap of the state of the art.

FIG. 1 shows a tap of the prior art in a longitudinal-section view. The tap 1 has a shank at one end of which is arranged a threading part 11, 12. The threading part 11, 12 consists in turn of a gate 11 and a guide part 12. The threading part has spirally arranged threaded teeth 4 which are interrupted by several longitudinally extending passages 3 in the form of flutes disposed in an outer periphery of the tap (or alternatively in the form of shallower grooves in a thread former). A cooling channel 5, 6 is also provided through which the coolant can be transported in the directions shown by the arrows. The cooling channel 5, 6 consists of an axially running part 5 and several generally radially running channels 6. The axially running part 5 of the cooling channel 5, 6 was initially produced here as a through bore and then sealed by an insert 8. Each of the generally radially running bores 6 connects the axially running part 5 of the cooling channel to a flute or oil groove.

It can be clearly seen that the generally radially running cooling channels 6 are not arranged wholly perpendicular to the axially arranged cooling channel 5, but are inclined in the direction of the front end or front end surface 7. There are essentially two reasons for this. Firstly, the appropriate diversion of the coolant ensures that the gate area 11 is also sufficiently supplied with coolant. Secondly, an arrangement of the channel 6 perpendicular to the axially running channel 5 would entail a correspondingly pronounced attenuation of the cross-section or core of the tap, with the result that, in particular when the tool is used, there is a danger of a tap fracture at the site of the attenuated cross-section. It can be seen in FIG. 1 that the diameter of drill core 9 is a function of the depth of the flutes or oil grooves 3. The thread core diameter 10 is determined by the groove base of the thread grooves 4.

Figure 2:
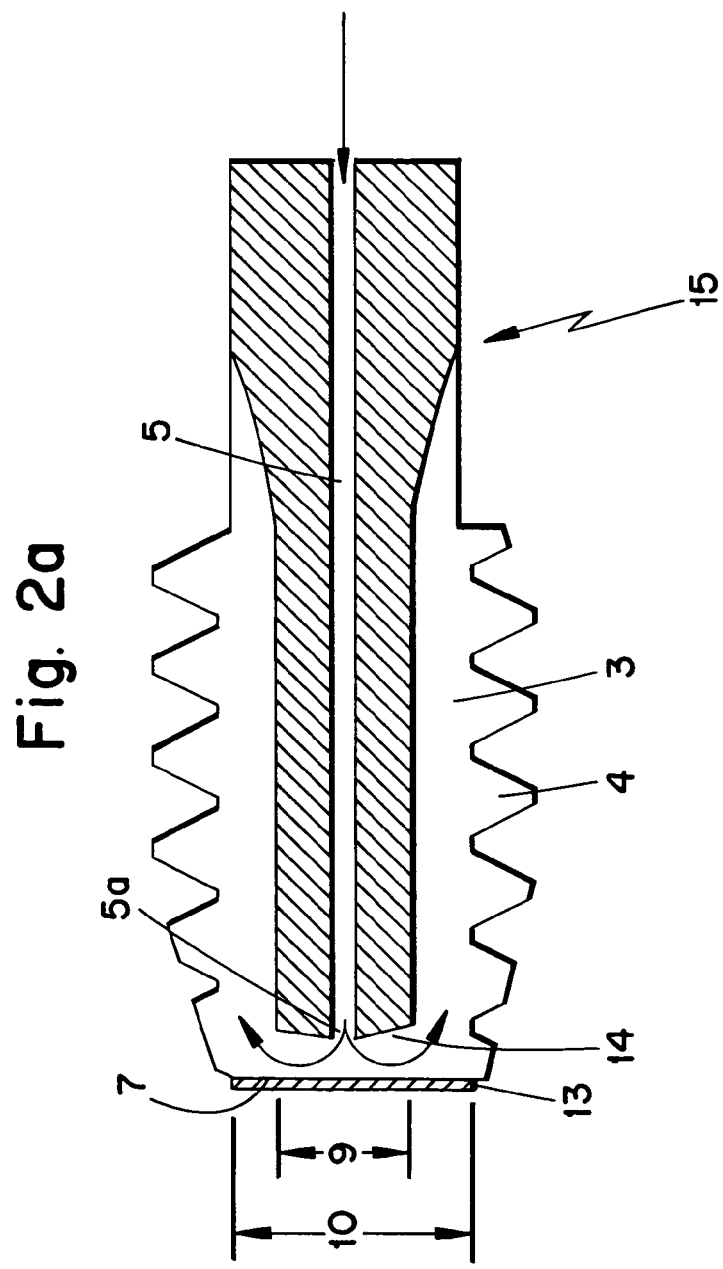

FIGS. 2*a*, 2*b* show a first version of a tap 15 according to the invention, wherein FIG. 2*a* is a schematic longitudinal-section view which corresponds to the view of FIG. 1. Here also the tool 15 has an axially running coolant channel 5. This is however developed as a through bore, i.e. it extends to the end surface 7 of the tap. On the front end surface 7 of the tap a diversion element 13 is provided which is developed here as a disk. The coolant which flows in the direction of the arrows shown in FIG. 2 thus firstly flows through the axial coolant channel 5 exits the cooling channel through an outlet 5*a* thereof formed in the end surface 7 and then strikes the diversion element 13. This diverts the coolant outwards generally in radial directions. It is clear that the front end of the axial coolant channel 5 is connected to the flutes 3 via lateral, preferably radial, connecting lines 14 of the end surface 7. These connecting lines 14 can be formed for example by milling troughs into the front end surface 7 of the tap before the diversion element 13 is secured e.g., by spot welds 16. With the tap 15 according to the invention there is thus no attenuation of the cross-section.

It may be expressly pointed out at this point that the connecting lines 14 are arranged directly at the tap tip, i.e., the front end surface not engaging with the workpiece in normal operation.

The arrangement according to the invention of the diversion element 13 has the advantage that the threading tool is clearly easier to produce and the coolant flow is then such that chip removal is supported. It is clear, looking at FIG. 1, that with the drilling tool of the state of the art shown in FIG. 1 friction-free chip removal is not always ensured because, due to the forward inclination of the radial coolant channels 6, i.e. in the direction of the end surface 7, the coolant is directed against the chip flow.

It can also be seen that the diversion disk 13 extends beyond the drill core to the thread core diameter 10. During operation therefore the diversion disk 13 seals off the core bore with the result that (almost) no coolant from the axial coolant channel 5 can pass between diversion disk 13 and workpiece or the inside wall of the core bore, but rather all of the coolant is diverted radially outwardly and forced to return through the flutes or oil grooves and travel past the circumferential surface of the threading tool.

Figure 3:
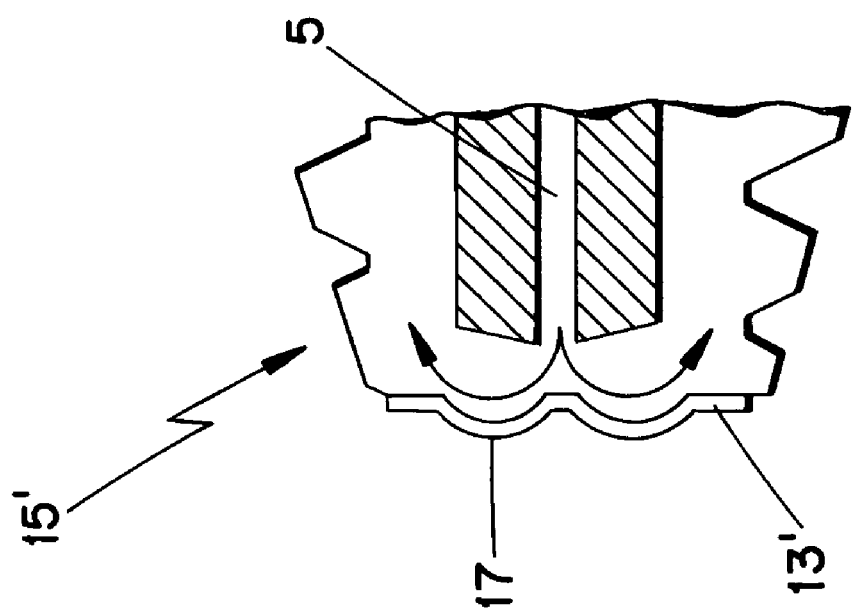
FIG. 3 a schematic representation of a part of a longitudinal section through a tap according to a second preferred embodiment of the present invention.

FIG. 3 shows a second version of the threading tool 15' according to the invention. Here the diversion disk 13' is provided with rearwardly facing recesses 17, each of which spans, in the radial direction, a thickness of the core 9. The recesses 17 ensure an optimal diversion of the coolant which exits the axially running coolant channel and strikes the diversion disk 13.

What is claimed is:

1. A threading tool comprising a threading part defining a longitudinal axis; a cooling channel extending inside of the threading part generally along the longitudinal axis to an outlet located in a front end surface of the threading part for supplying a coolant thereto; and a diversion element arranged such that coolant flowing out of the cooling channel is diverted radially outwards at the diversion element, wherein the diversion element is a disc secured to the end surface of the threaded tool and wherein there is a passage on the end surface of the threaded tool between the cooling channel and at least one flute or oil groove.

2. The threading tool according to claim 1 wherein the diversion element extends laterally outwardly far enough to at least partially cover the at least one flute or oil groove.

3. The threading tool according to claim 2 wherein the diversion element extends laterally outwardly far enough to completely cover the at least one flute or oil groove.

4. The threading tool according to claim 1 wherein a core of the threading part is disposed radially inside of the at least one flute or oil groove, the diversion element extending entirely across the core.

5. The threading tool according to claim 4 wherein the diversion element extends laterally outwardly past the core.

6. The threading tool according to claim 1 consisting of a bottom hole screw tap.

7. The threading tool according to claim 1 wherein the threading part is formed of a hard metal.

8. The threading tool according to claim 1 wherein a surface of the diversion element facing the threading part includes at least one recess disposed in front of the passage.

9. The threading tool according to claim 1 wherein a surface of the diversion element facing the threading part includes at least one recess extending laterally from a front end of the coolant channel to the at least one flute or oil groove.

10. The threading tool according to claim 9 wherein the at least one flute or oil groove comprises a plurality of circumferentially spaced flutes or oil grooves, and the at least one recess comprises a corresponding plurality of recesses.

11. The threading tool according to claim 10 wherein the recesses are arranged symmetrically about the longitudinal axis.

12. The threading tool according to claim 10 wherein each recess is circular as viewed in a direction parallel to the longitudinal axis.

13. The threading tool according to claim 1 wherein the threading part includes outwardly projecting forming teeth.

14. The threading tool according to claim 1 wherein the disk is welded to the threading part.

15. The threading tool according to claim 1 wherein a surface of the disk facing the threading part is substantially flat.

16. The threading tool according to claim 1 wherein the threading part includes outwardly extending teeth, the teeth forming a gate portion and a guide portion, the gate portion disposed at a front region of the threading part, the guide portion disposed rearwardly of the gate portion and being of greater diameter.

17. The threading tool according to claim 1 wherein the threading part includes outwardly projecting chip-cutting teeth.

* * * * *